Apr. 3, 1923.

E. E. WICKERSHAM

TRACTOR TREAD LINK

Filed May 26, 1920

WITNESS
H. A. Sherburne

INVENTOR
E. E. Wickersham
BY
Chas. E. Townsend
his ATTORNEY

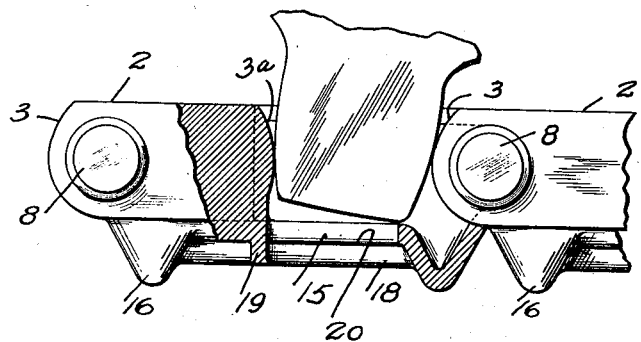
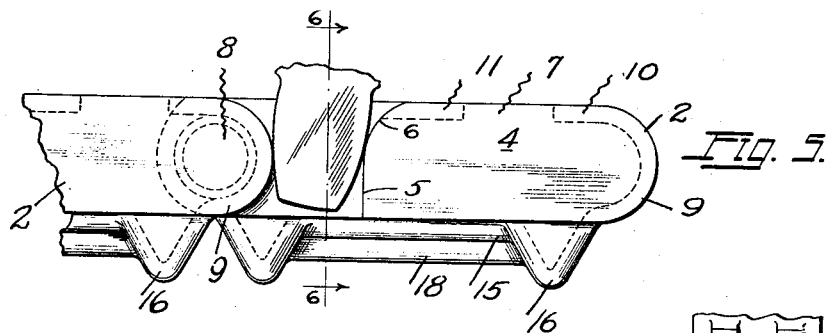
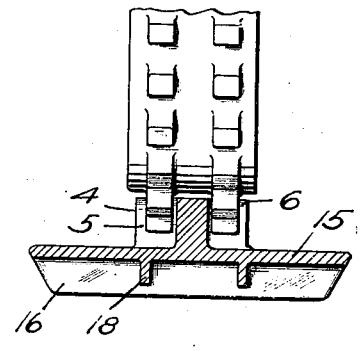
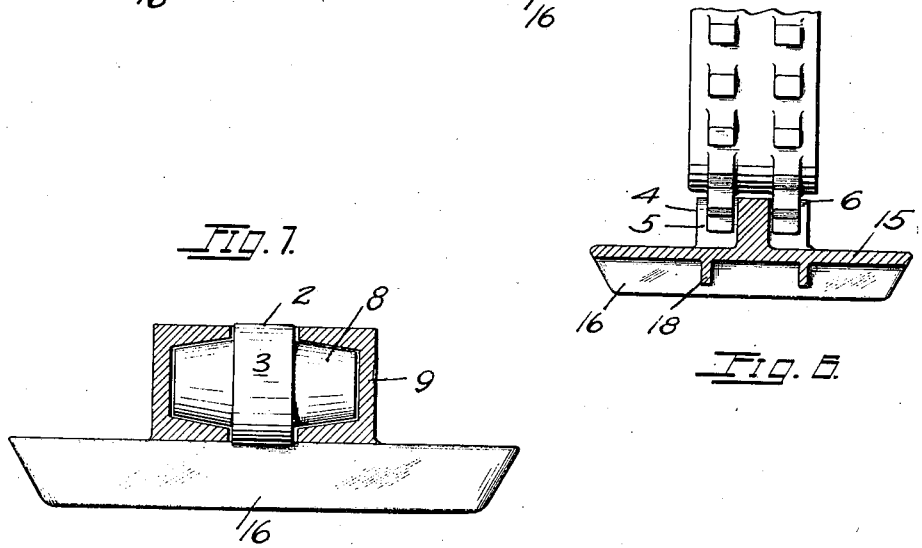

Patented Apr. 3, 1923.

1,450,471

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTOR TREAD LINK.

Application filed May 26, 1920. Serial No. 384,347.

*To all whom it may concern:*

Be it known that I, ELMER E. WICKERSHAM, a citizen of the United States, and a resident of Stockton, in the county of San Joaquin and State of California, have invented a new and useful Improvement in Tractor Tread Links, of which the following is a specification.

This invention relates to endless-belt traction engines and particularly to improved links for the traction belt of such types of engines.

It is one of the objects of the present invention to provide an improved tread link that can be produced complete ready to be interlocked with others of a complete belt or chain and which is constructed and arranged in relation of its parts so as to eliminate machining or finishing of the operative surfaces of the co-acting elements of connected links and in this connection it is a further object of the invention to provide a unitary link body and tread plate.

A further object of the invention is to provide a combined link body and tread plate in which the several structural features are simple, substantial and are so positioned and arranged as to be durable and to permit the ready attachment or instant connection of a series of the links in the formation of an endless belt or traction chain.

A further object of the invention is to provide an improved traction belt link with means enabling its co-action either with a sprocket wheel having a single peripheral row of teeth or with twin or plural rows of teeth.

A further object of the invention is to provide a link of such construction that it can be readily interchanged and replaced so as to facilitate renewal of worn and broken parts and it is a special object of the present invention to provide an interlocking link adapted for connection in a series without the requirement of extraneous or loose or special fastening means.

Another object of the invention is to provide a unitary link body and tread plate, the body having on one end a pivot forming head and at its opposite end a pivot head receiving socket device which socket is provided with a dirt discharge chamber for the continual discharge of dirt that may be gathered up in the operation of the endless belt.

The invention possesses other objects and features of advantage, some of which with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 4 is a partial side elevation and section of link members in co-action with a sprocket wheel having a single row of teeth.

Figure 5 is a partial side elevation and section of links in co-action with a sprocket wheel having double or twin rows of teeth.

Figure 6 is a cross section on line 6—6 of Figure 5.

Figure 7 is a cross section on line 7—7 of Figure 2.

Figure 1:
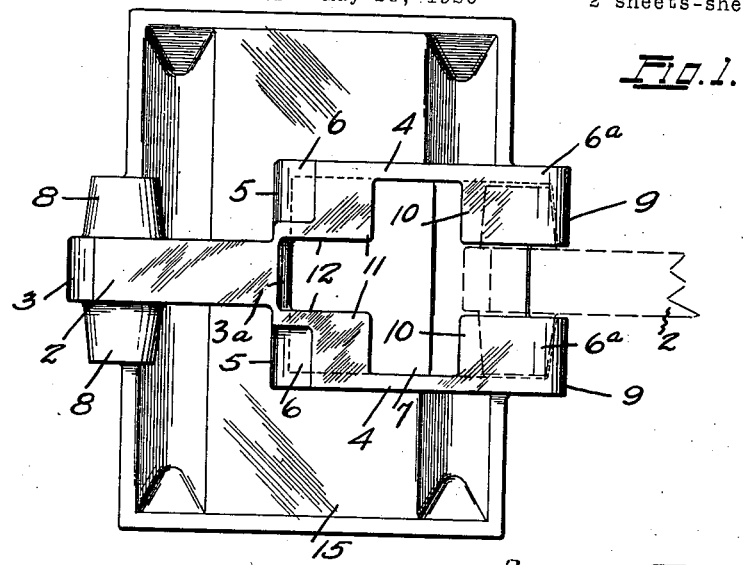
Figure 1 is a plan view of the improved link, showing an attached link in dotted lines.
Figure 2:
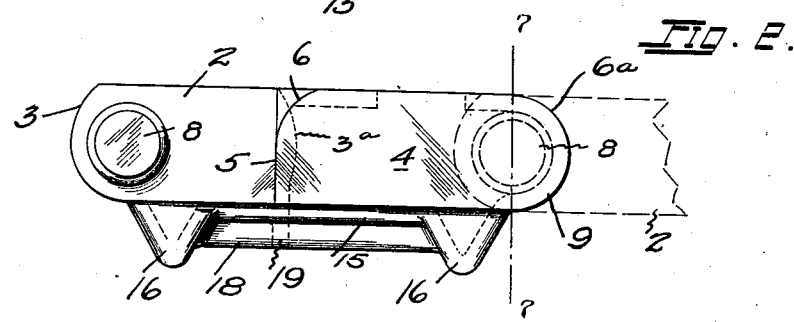
Figure 2 is a side elevation of the improved link also showing in dotted lines an attached link.
Figure 3:
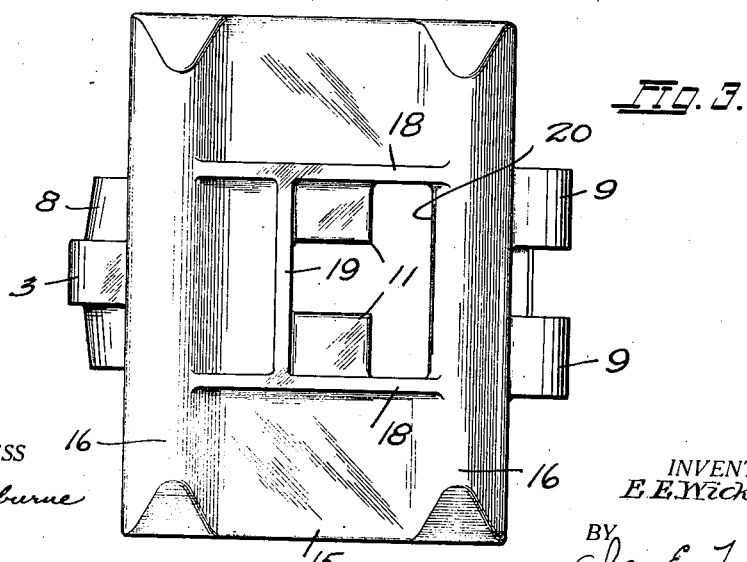
Figure 3 is a bottom plan view of the link.

The preferred form of the link embodies a medial wall or web member 2 of suitable length, height, and thickness according to the desired strength and dimensions of a given sprocket wheel with which a link is intended to co-operate and one end of the link is shown as rounded at 3 to form a wearing wall; the opposite end of the wall or web 2 merging into and forming a part of a socket comprising a pair of parallel spaced side walls or webs 4—4 which stand materially beyond the side faces of the link body 2 and thus present end walls 5—5 the surfaces preferably of which are rounded or otherwise suitably shaped as at 6—6 to co-operate with adjacent tooth surfaces of sprocket wheels in a manner to be described hereinafter.

Between the sprocket walls 4—4 is formed a transverse mouth or opening 7 of a length slightly greater than the laterally extending pivot heads 8—8 that are formed on the opposite sides of the front end of the web or wall 2 and which pivot heads are shown as slightly conical and have flat end faces that are designed to be readily passed downwardly into the mouth 7 of the socket after which, in the attachment of adjacent links, the pivot heads 8—8 of one link may be shifted with a movement longitudinal with respect to the link proper so as to enter complementary seats or pockets 9—9 forming rear portions of the socket walls 4—4.

These seats 9—9 have substantially semi-cylindrical transverse walls against which the pivot heads 8—8 are drawn and these heads are retained against upward movement or play by the overhanging portions 10—10 of the socket walls. The seats 9—9 are spaced from each other transversely, with respect to the medial longitudinal line of the link, a distance that is substantially slightly greater than the thickness of an interposed link body member 2.

The front transverse end walls 5—5 of the socket forming parts of the links are shown as extended upwardly, thence rearwardly in the form of spaced overhanging top leaves 11—11 the rear transverse edges of which form lips of the mouth 7 of the socket and the parallel edges 12 of which form side or lateral guides to co-operate with the entering teeth of a sprocket wheel when an assembled link chain or tread member is operative on the wheel.

From the above it will be seen that the link body proper comprises the web or wall member 2 forming a medial part, one end of which is surfaced or rounded as at 3 to co-act with a sprocket wheel 2 and the opposite end of this medial part 2 is also rounded or surfaced as at 3ª so that when interconnected links operate over the sprocket wheel the teeth of the latter will project into the longitudinally extending portion of the mouth 7 of the socket in one link and will bear on the adjacent surfaces 3 and 3ª of the link body part 2.

The improved link is equally efficiently co-operative with that type of sprocket wheels having twin or plural rows of teeth in which case the links bear upon the sprocket teeth or engage the sprocket teeth on the surfaces 6—6 at one side of the socket portion and also bear on the sprocket teeth at the surfaces 6ª of the cylindrical part of the pivot seat or pocket 9.

From the above it will be seen that a series of these links can be prepared and be readily interlocked with each other to form a chain or endless belt without the requirement of extraneous fastening means and furthermore that the several wearing faces as between attached links and as between the links and the sprocket teeth are so positioned and designed as to be readily applicable to the relative or co-operative part and machining and finishing of these surfaces is therefore entirely eliminated. The link preferably is made of a unitary casting and the desired degree of hardness can be given to the same by any suitable process as for instance by heat hardening or otherwise.

Preferably the improved link is provided with a unitary tread or bearing plate or member of any suitable form and this is shown as comprising a generally flat bottom portion 15 disposed transversely beneath the lower edge or portion of the medial wall or rib 2 and projecting to a suitable distance beyond the same laterally to give the desired tread area. For increasing tractive efficiency suitable ribs or corrugations may be extended transversely of the links and these are shown as in the form of V shaped downwardly extending projections 16 adjacent each longitudinal edge of the tread part.

The front and rear longitudinal edges of the tread plate 15 are shown as parallel to the axes of the front pivot lugs 8—8 and of the pivot seat 9. The lower face of the tread plate 15 is shown as provided with parallel re-enforcing ribs or flanges 18 extending between the longitudinal corrugations 16 and a longitudinal re-enforcing rib 19 connects the ribs 18.

One of the features of the present invention is to provide for the self-cleaning action of the tread during the operation of the same as a belt or traveling platform and to that end a central portion of each tread plate 15 is provided with an outlet mouth or opening 20 formed in that part of the plate adjacent to the socket or chamber forming walls 4—4 so that any dirt passing into the mouth 7 of the link chamber or pocket can work its way outwardly either through the top mouth or opening 7 or through the opening 20 in the bottom of the plate as the case may be.

From the above it will be seen that I have provided a chain link and plate that is simple, that is substantial and that may be inexpensively manufactured as by casting in one complete piece with its several wear-taking faces so positioned that interlocking parts may be connected together to form a chain in a ready manner. Further it will be seen that the several teeth engaging surfaces of the links are so positioned and arranged that they can be cast complete ready for use without any machining or finishing.

It is understood that various changes may be resorted to in the construction of the device and the arrangement of its details without departing from the spirit of the invention and within the scope of the appended claims.

I claim:

1. A tread-link, for tractor tread-belts, having a link forming body part and a tread plate, the body part having a transverse pivot head, and a pivot head socket for interlock with a companion link, the socket having pairs of front and rear shoulders with transverse faces to co-operate with double row teeth sprocket wheels.

2. A tread-link, for tractor tread-belts, having a link forming body part and a tread plate, the body part having a transverse pivot head, and a pivot head socket for interlock with a companion link, the body part having a medial web or wall with end faces to co-act with a sprocket wheel.

3. A tread-link, for tractor tread-belts, having a link forming body part and a tread plate, the body part having a transverse pivot head, and a pivot head socket for interlock with a companion link, the socket having pairs of front and rear shoulders with transverse faces to co-operate with double row teeth sprocket wheels, the body part having a medial web or wall with end faces to co-act with a sprocket wheel.

4. A tread-link, for tractor tread-belts, having a link forming body with a medial web or wall having, at one end, oppositely extending heads forming pivots, the other end having a socket with opposite pivot seats spaced to receive the web of a complementary link web, said body having a recess on its inner side to co-act with teeth of a sprocket wheel, and a tread plate formed at the outer side of the body.

5. A tread-link, for tractor tread-belts, having a link forming body with a medial web or wall having, at one end, oppositely extending heads forming pivots, the other end having a socket with opposite pivot seats spaced to receive the web of a complementary link web, the socket having a top wall with a transverse mouth of a length to receive the pivot heads of an attached link, said body having a recess on its inner side to co-act with teeth of a sprocket wheel, and a tread plate formed at the outer side of the body.

6. A tread-link, for tractor tread-belts, having a link forming body with a medial web or wall having, at one end, oppositely extending heads forming pivots, the other end having a socket with opposite pivot seats spaced to receive the web of a complementary link web, the socket having a top wall with a transverse mouth of a length to receive the pivot heads of an attached link, the latter interlocking when shifted from the mouth into the pivot seats, said body having a recess on its inner side to co-act with teeth of a sprocket wheel, and a tread plate formed at the outer side of the body.

7. A tread-link, for tractor tread-belts, having a link forming body with a medial web or wall having, at one end, oppositely extending heads forming pivots, the other end having a socket with opposite pivot seats spaced to receive the web of a complementary link web, the inner end of one link wall and the adjacent end of an attached link forming means to co-act with a sprocket wheel tooth.

8. A chain track for vehicles comprising a series of articulated links, each link having a central up-standing web portion formed with lateral projections at one end, the opposite end of the web portion being bifurcated and formed with sockets to receive the projections on the end of the adjacent link, said bifurcated end portion having a slot formed ahead of the sockets to permit insertion of the projections and also constituting a pocket to receive the teeth of a sprocket wheel.

In testimony whereof I have hereunto set my hand in the presence of two subscribing witnesses.

ELMER E. WICKERSHAM.

Witnesses:
JOHN H. HERRING,
VALERIE D. REMER.